United States Patent [19]

Sonobe et al.

[11] Patent Number: 4,643,572

[45] Date of Patent: Feb. 17, 1987

[54] DRIVING CIRCUIT OF A GRATING

[75] Inventors: Youji Sonobe; Youichi Tamura, both of Tokyo; Kenichiro Umesaki, Atsugi, all of Japan

[73] Assignee: Anritsu Electric Company, Limited, Tokyo, Japan

[21] Appl. No.: 635,297

[22] Filed: Jul. 27, 1984

[30] Foreign Application Priority Data

Aug. 4, 1983 [JP] Japan .................. 58-141887

[51] Int. Cl.[4] .............................. G01J 3/18
[52] U.S. Cl. .................. 356/334; 364/498
[58] Field of Search ........... 356/318, 328, 331, 332, 356/334; 364/498

[56] References Cited

U.S. PATENT DOCUMENTS

| 4,245,908 | 1/1981 | Gawlick | 356/334 |
| 4,318,616 | 3/1982 | Chamran et al. | 356/334 |
| 4,322,807 | 3/1982 | Chamran et al. | 364/498 |
| 4,469,441 | 9/1984 | Bernier et al. | 356/334 |

FOREIGN PATENT DOCUMENTS

| 0055687 | 5/1977 | Japan | 356/332 |
| 0154635 | 11/1981 | Japan | 356/308 |

OTHER PUBLICATIONS

Angus, *Optical Spectra*, vol. 14, No. 8, Aug. 1980, pp. 49-52.

*Primary Examiner*—F. L. Evans
*Assistant Examiner*—Joel L. Harringa
*Attorney, Agent, or Firm*—Frishauf, Holtz, Goodman & Woodward

[57] ABSTRACT

A driving circuit for rotating the grating of a monochromator thereby changing the wavelength of light which is emitted from the monochromator. This driving circuit includes an operating panel for supplying wavelength data, a data converting circuit which obtains a trigonometric function value corresponding to the wavelength data when the data converting circuit receives the wavelength data, and which converts the wavelength data to angle data on the basis of the trigonometric function value, and a motor driver for rotating the grating into the angular position corresponding to the angle data.

1 Claim, 8 Drawing Figures

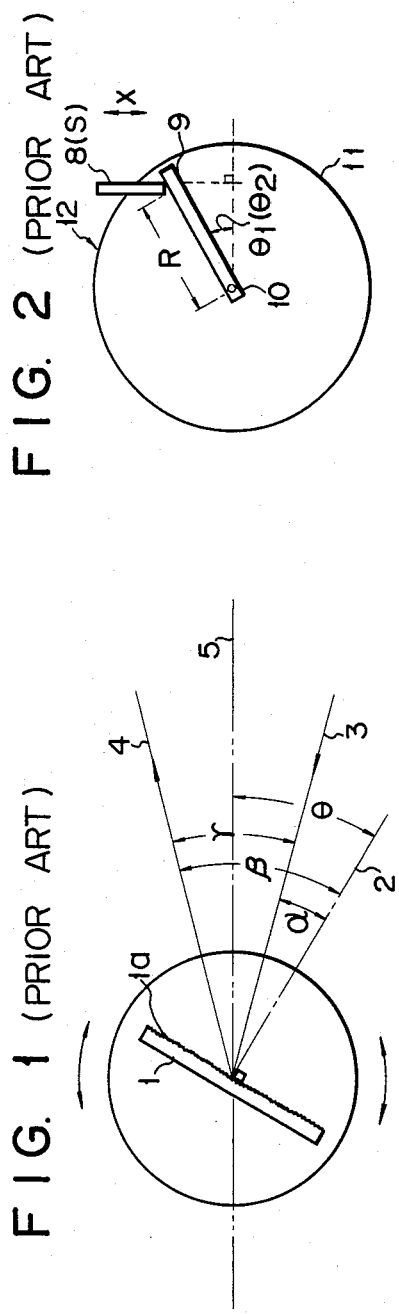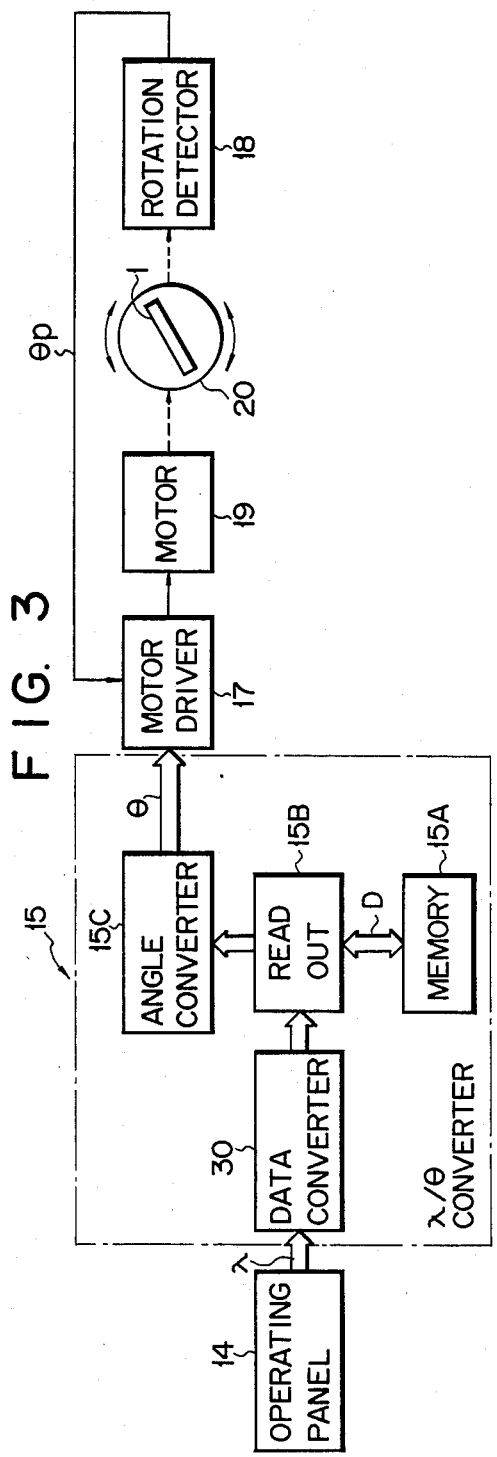

DRIVING CIRCUIT OF A GRATING

BACKGROUND OF THE INVENTION

This invention relates to a driving circuit of a grating for rotating the grating of a monochromator and, more particularly, to a driving circuit of a grating in which, when wavelength data is input, angle data is calculated from the wavelength data, and the grating is caused to rotate on the basis of this calculated result.

Conventionally, in one type of monochromator optical equipment, in the case of detecting the wavelength distribution or the like of light as shown in FIG. 1, a incident light 3 is split into spectra by a grating (diffraction grating) 1 rotatably provided at a predetermined portion of the main body of the monochromater (not shown). A light component having a desired wavelength is thus taken from the incident light 3 by a slit apparatus (not shown) and focusing it in a light receiver apparatus (not shown).

With such a grating system, however, when the incident light 3 is provided thereto with only an angle $\alpha$ of inclination from a normal line 2, which is perpendicular to a lattice plane $1_a$ of the grating 1, a primary light 4 having a wavelength $\lambda$, represented by the equation $$\lambda = d(\sin \alpha + \sin \beta) \ldots \quad (1)$$

is emitted in a direction with an angle $\beta$ of inclination from the normal line 2, wherein d indicates a lattice constant of the grating 1. On the other hand, in this case, a difference angle $\gamma$ between the incident light 3 and the primary light 4 shown in FIG. 1 is determined dependent upon the location of a mirror (not shown) to supply the incident light 3 to the grating 1 and the location of a mirror (not shown) which receives the primary light 4. Therefore, assuming that $\beta - \alpha = \gamma$ (constant) and by substituting this for equation (1) and further by modifying the equation thus obtained, $$\lambda = 2d \times \cos\left(\frac{\gamma}{2}\right) \times \sin\left(\alpha + \frac{\gamma}{2}\right) \quad (2)$$

can be derived. In this equation (2), since $2d \times \cos\left(\frac{\gamma}{2}\right)$ is a constant, this is substituted by a constant A. Also since the angle $$\left(\alpha + \frac{\gamma}{2}\right)$$

is the angle between a normal line 2 and an axis 5 which divides the angle $\gamma$ into two, this is substituted by a variable $\theta$; thus, equation (2) will be $$\lambda = A \cdot \sin \theta \ldots \quad (3).$$

As will be understood from equation (3), to emit the primary light 4 of the wavelength $\lambda$ from this grating 1 when the incident light 3 is supplied to the grating 1, it is necessary to rotate the grating 1 by only the angle $\theta$ $$\left[\text{where, } \theta = \sin^{-1}\left(\frac{\lambda}{A}\right)\right]$$

corresponding to the wavelength $\lambda$.

FIG. 2 is a diagram showing one example of a sine bar as one of the devices to perform such wavelength/angle conversion. As illustrated in this diagram, the sine bar 12 is constituted in a manner such that a rod member 9 which abuts a movable member 8 is rotated around an axis 10 in association with the movement of the movable member 8 in the X direction by means of a motor or the like (not shown), and at the same time, a grating mounting plate 11 fixed to this axis 10 is also rotated. Therefore, when the amount of travel S of the movable member 8 is small, the relation $$S = R \cdot \sin \theta \ldots \quad (4)$$

is satisfied between the travel amount S and the rotational angle ($\theta_1 - \theta_2$) of the grating mounting plate 11. In this case, R indicates a distance from the axis 10 to the contact point of the rod member 9 and movable member 8, and $\theta$ represents the difference angle between the angle $\theta_1$ before deformation and the angle $\theta_2$ after deformation. As can be seen from a comparison of equations (3) and (4), if the movable member 8 can be moved by only the amount S $$\left(S = \frac{R}{A} \cdot \lambda\right)$$

corresponding to the wavelength $\lambda$, the primary light 4 of the wavelength $\lambda$ can be emitted from the grating 1.

However, since the amount of change of the arm length R of the rod member 9 increases with an increase in the travel amount S, such a sine bar 12 cannot cover a wide wavelength range. Also, even when the travel amount S lies within a narrow range, the arm length R slightly changes and the rod member 9 and the movable member 8 are mutually worn out due to contact with each other, so that a high degree of accuracy cannot be obtained. Further, such a sine bar 12 cannot be miniaturized due to the structure thereof, so that there is an inconvenience such as an increase in mounting space for the grating driving apparatus.

SUMMARY OF THE INVENTION

It is, therefore, an object of the present invention to provide a new and improved driving circuit of a grating in which a wide wavelength range can be covered and a high degree of conversion accuracy can be obtained, and further, the whole grating driving apparatus can be miniaturized.

According to the present invention, a driving circuit of a grating, which rotates the grating of a monochromator and changes the wavelength of light emitted from the monochromator, comprises: a means for supplying wavelength data; a data converting means which obtains a trigonometric function value corresponding to the wavelength data when it receives the wavelength data, thereby converting the wavelength data to the angle data on the basis of the trigonometric function value; and a driving means for rotating the grating into the angular location corresponding to the angle data.

With such a constitution, it is possible to provide a driving circuit of a grating in which a wide wavelength range can be covered and a high degree of conversion accuracy can be obtained, and further, the whole grating driving apparatus can be miniaturized.

BRIEF DESCRIPTION OF THE DRAWINGS

The present invention can be understood by reference to the accompanying drawings, in which:

FIG. 1 is a diagram to explain the relation between the rotational angle of the conventional grating and the primary light which is emitted from this grating;

FIG. 2 is a diagram showing one example of the conventional sine bar which is used as a wavelength/angle converting system of FIG. 1;

FIG. 3 is a block diagram showing the first embodiment of a driving circuit of a grating according to the present invention;

DETAILED DESCRIPTION OF THE PREFERRED EMBODIMENTS

Figure 5:
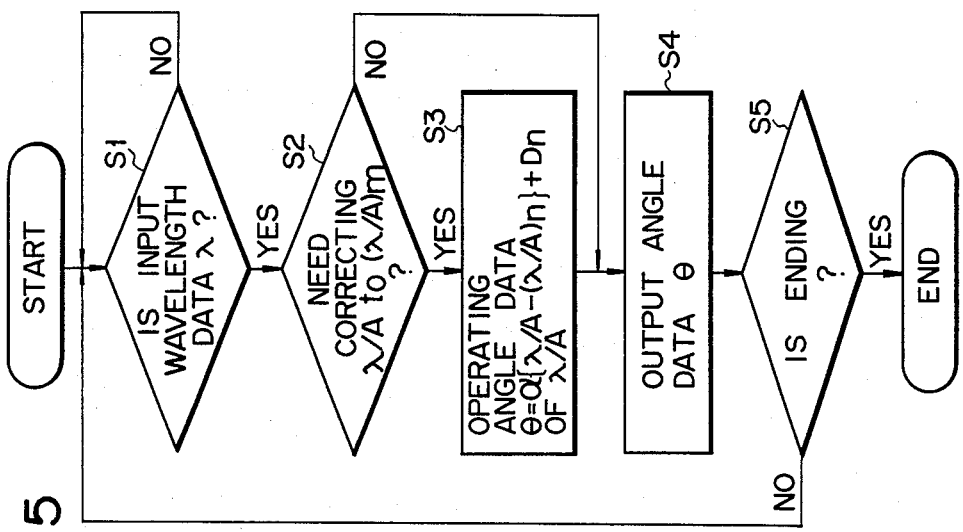
FIG. 5 is a flow chart to explain this first embodiment.

This invention will be described below with respect to embodiments shown in the drawings. FIG. 3 is a block diagram showing the first embodiment of the driving circuit of a grating according to the present invention. FIG. 3 shows an operating panel 14 for optical equipment equipped with the present driving circuit. The wavelength data $\lambda$ input from this operating panel 14 is supplied to a wavelength/angle converter (hereafter, abbreviated as a $\lambda/\theta$ converter) 15. The $\lambda/\theta$ converter 15 comprises a data converter 30, readout means 15B, an angle converter 15C, and a memory 15A. When the wavelength data $\lambda$ is supplied from the operating panel 14, this wavelength data $\lambda$ is divided by the constant A in the data converter 30 to obtain the data $\lambda/A$. A readout signal D corresponding to this data $\lambda/A$ is supplied through the readout means 15B to the memory 15A. Data corresponding to respective wavelength intervals 1 to n, as shown in the table below, is stored in the memory 15A as follows: the sine value data $(\lambda/A)_1$ corresponding to the angle $\theta_1$ [where, $(\lambda/A)_1 = \sin\theta_1$]; the sine value data $(\lambda/A)_2$ corresponding to the angle $\theta_2$ [where, $(\lambda/A)_2 = \sin\theta_2$]; the sine value data $(\lambda/A)_n$ corresponding to the angle $\theta_n$ [where, $(\lambda/A)_n = \sin\theta_n$]; and the gradients $\alpha_1, \alpha_2, \ldots, \alpha_n$ between these respective angles $\theta_1-\theta_2, \ldots, \theta_{n-1}-\theta_n$. When a readout signal D is supplied from the $\lambda/\theta$ converter 15, the data in the wavelength interval indicated by this readout signal D is read out and is supplied to the readout means 15B. Namely, when the readout means 15B outputs the readout signal D indicative of the wavelength interval 2, the value 0.0628 of the data $(\lambda/A)_2$ corresponding to the wavelength interval 2 is selected from the memory 15A as shown in the table below and is supplied to the readout means 15B. In addition, in the case where the readout means 15B selects any one of the wavelength intervals 3 to n, one value of the sine value data $(\lambda/A)_3$ to $(\lambda/A)_n$ corresponding to the selected wavelength interval is also similarly supplied to the readout means 15B.

| Wavelength interval n | Sine value data $(\lambda/A)_n$ | Angle data $\theta_n$ | Gradient data $\alpha_n$ |
|---|---|---|---|
| 1 | 0 | 0°00' | 57.3284 |
| 2 | 0.0628 | 3°36' | 57.5079 |
| 3 | 0.1254 | 7°12' | 57.9710 |
| 4 | 0.1875 | 10°48' | |
| . | . | . | . |
| . | . | . | . |
| . | . | . | . |
| n − 2 | 0.9921 | 82°48' | |
| n − 1 | 0.9981 | 86°24' | 600.0000 |
| n | 1.0000 | 90°00' | 1894.7368 |

After the readout means 15B fetches the sine value data from the memory 15A in response to the readout signal, it compares the value of the above-mentioned data $\lambda/A$, which is the former arithmetic result, with the value of the sine value data $(\lambda/A)_m$ (m is an integer indicative of any one of 1 to n) read out from the memory 15A. When $(\lambda/A)_m < \lambda/A$, the readout means 15B reads out the sine value data $(\lambda/A)_{m+1}$ corresponding to $(m+1)$, which is larger than the wavelength interval m at this time. On the other hand, when $(\lambda/A)_m > \lambda/A$, it reads out m, the sine value data $(\lambda/A)_{m-1}$ corresponding to $(m-1)$ which is smaller than the wavelength interval m at this time, and repeats this comparison operation, thereby obtaining the value of m which satisfies the relation $[(\lambda/A)_m < \lambda/A < (\lambda/A)_{m+1}]$, namely, the wavelength interval m in which the above-mentioned data $\lambda/A$ is included. Next, the angle converter 15C for converting to the angle data subtracts the sine value data $(\lambda/A)_m$ corresponding to the wavelength interval m from the data $\lambda/A$ and temporarily stores this subtraction result $[\lambda/A - (\lambda/A)_m]$. Further, the angle converter 15C reads out the angle data $\theta_m$ and gradient data $\alpha_m$ corresponding to the wavelength interval m from the memory 15A and performs the arithmetic operation shown in the following equation:

$$\theta = \alpha_m[\lambda/A - (\lambda/A)_m] + \theta_m \qquad \ldots (5).$$

In this case, the angle data $\theta_m$ indicates the sine angle corresponding to the data $(\lambda/A)_m$, and the gradient data $\alpha_m$ represents the gradient angle from this angle data $\theta_m$ to the next angle data $\theta_{m+1}$. Thus, the angle data $\theta$ for the data $\lambda/A$ is obtained from equation (5). On the other hand, in the case where the equation $\lambda/A = ($-

$\lambda/A)_m$ is satisfied in the foregoing comparison operation, the readout means 15B reads out the angle data $\theta_m$ of the waveform interval m corresponding to this $(\lambda/A)_m$ from the memory 15A and outputs this as the angle data $\theta$ from the angle converter 15C.

Figure 4:
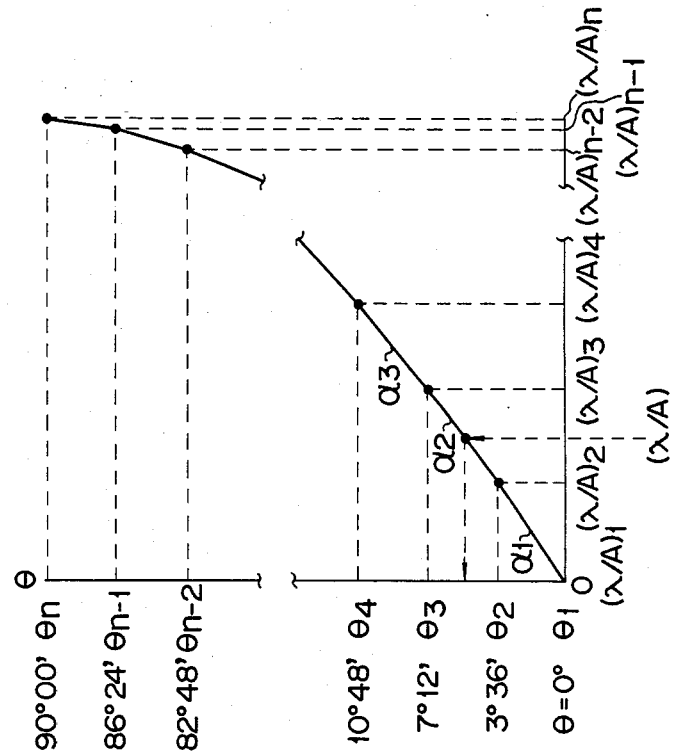
FIG. 4 is a graph representing the correspondence between the sine value data and the gradient data which are used in FIG. 3.

Therefore, for example, the wavelength $\lambda$ is input from the operating panel 14 and in correspondence with this, when the value of the data $\lambda/A$ lies between the sine value data $(\lambda/A)_2$ and $(\lambda/A)_3$, as shown in FIG. 4, the $\lambda/\theta$ converter 15 reads out the angle data $\theta_2$ and gradient data $\alpha_2$ corresponding to the sine value data $(\lambda/A)_2$ from the memory 15A. Also, the converter 15 performs the arithmetic operation shown in equation (5) to obtain the angle data $\theta$ and supplies it to a motor driver 17. The motor driver 17 compares the angle data $\theta$ with the value of an angle detection signal $\theta_p$ output from a rotation detector 18 to detect the rotational angle of the grating 1, and it controls a motor 19 so as to make them coincident. When the motor 19 is driven by this motor driver 17, a grating mounting plate 20, on which the grating 1 is mounted, is rotated in correspondence to this. The rotational deformation amount at this time is detected by the rotation detector 18 and is fed back to the motor driver 17.

Next, the operation of this first embodiment constituted as described above will be described with reference to the flow chart shown in FIG. 5.

First, when the circuit is activated, the $\lambda/\theta$ converter 15 executes step S1 and maintains the standby mode until the wavelength data $\lambda$ is input. When the operating panel 14 is operated and the wavelength data $\lambda$ is input, the $\lambda/\theta$ converter 15 executes the next step S2 and compares the data $\lambda/A$ obtained in correspondence with the wavelength data $\lambda$ with the sine value data $(\lambda/A)_m$ previously stored in the memory 15A, thereby discriminating to see if there exists the wavelength interval m which satisfies $\lambda/A=(\lambda/A)_m$. When this condition is not satisfied, namely, when $(\lambda/A)_m<\lambda/A<(\lambda/A)_{m+1}$, the converter 15 executes step S3 and performs a linear approximating operation as shown in equation (5), thereby obtaining the angle data $\theta$ corresponding to the data $\lambda/A$. Next, in step S4, the $\lambda/\theta$ converter 15 supplies the angle data $\theta$, obtained by the above-mentioned arithmetic processing, to the motor driver 17 and driving the motor 19 to rotate the grating 1 by only the angle corresponding to the angle data $\theta$. Thereafter, the processing is returned through step S5 to the initial step S1.

On the other hand, in the above-described operation, when it is determined that there is no need to interpolate in step S2, namely, when the value of $\lambda/A$ input coincides with the sine value data stored in the memory 15A, step S3 is omitted and steps S4 and S5 are directly executed.

In addition, although this embodiment has been explained with respect to the example in the case where the gradient data $\alpha_1-\alpha_n$ are stored in the memory 15A, these gradient data $\alpha_1-\alpha_n$ may be obtained by substituting $\lambda=\lambda_n$ for the gradient $$\left(\frac{d\theta}{d\lambda}\right) = \frac{1}{\sqrt{A^2-\lambda^2}},$$

which is derived by differentiating both sides of $\lambda=A\sin\theta$.

Further, the circuit may be constructed so that the angle data $\theta$ is obtained by the program operation based on the wavelength data $\lambda$, supplied from the operating panel 14, by use of a microprocessor (not shown) having an ROM (read only memory) in which programs are stored and an RAM (random access memory) or the like serving as the working area, and the angle data $\theta$ obtained in this way is output. In this case, when the wavelength data $\lambda$ is input from the operating panel 14, the microprocessor instead of the converter 15 obtains the data x $(x=\lambda/A)$ on the basis of this wavelength data $\lambda$ and the constant data A stored in the ROM. At the same time, it obtains the angle data $\theta(\theta=\sin^{-1}x)$ on the basis of this data x and the programs stored in the ROM; namely, on the basis of a first program to be sequentially operated a limited number of times for each term on the right side in the Maclaurin expanded expression, indicated by $$\sin^{-1}x = x - \frac{x(1-x^2)^{-\frac{3}{2}}}{2} \cdot x^2 \qquad (6)$$
$$+ \frac{\left\{(1-x^2)^{-\frac{3}{2}} + 3x^2(1-x^2)^{-\frac{5}{2}}\right\}}{3!} \cdot x^3$$
$$+ \ldots,$$

and a second program to sequentially add the respective values obtained in accordance with the first program. The angle data $\theta$, which is the result of this arithmetic operation, is supplied through an interface (not shown) to the motor driver. In this way, even if the wavelength data $\lambda$ is converted to the angle data $\theta$ by the program operation, the grating 1 can be rotated by only the angle corresponding to the wavelength data $\lambda$ in a manner similar to the foregoing, first embodiment.

In addition, the operation shown in equation (6) may be performed in such a manner that the wavelength data $\lambda$ is converted to the angle data $\theta$ by use of a logic circuit (not shown) for performing such an operation; namely, by use of a $\lambda/\theta$ conversion logic circuit which has: a first logic circuit to output the input data x as it is; a second logic circuit to operate $$x - \frac{x(1-x^2)^{-\frac{3}{2}}}{2} \cdot x^2$$

from the data x; and an adder to add the values obtained in these logic circuits.

As described above, even if the arithmetic logic circuit is constituted by hardware, a similar effect as that mentioned above can be obtained. Further, in this case, the operating speed can be made fast.

Also, although the wavelength data λ is converted to the angle data θ on the basis of the Maclaurin expanded expression of the arcsine, $\sin^{-1} x$ may be derived by integrating $$\frac{1}{\sqrt{1-x^2}}$$

or by use of other operational expressions.

Figure 6A:
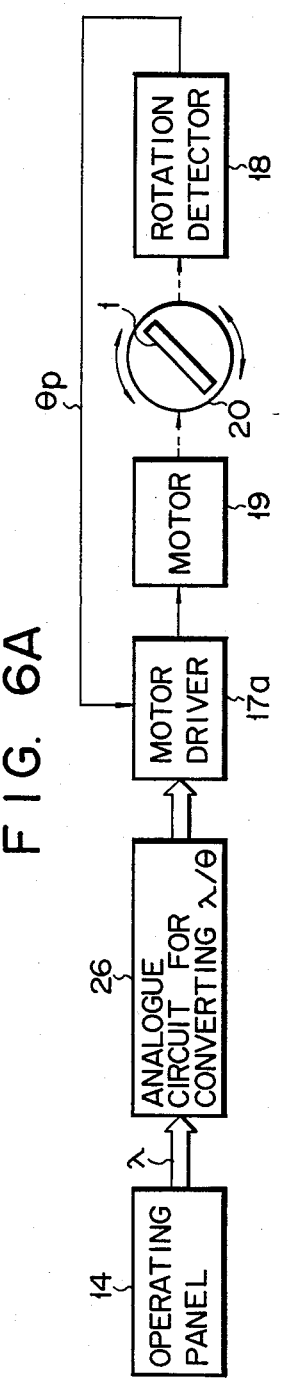
FIGS. 6A and 6B are block diagrams showing the second embodiment of the present invention.
Figure 7:
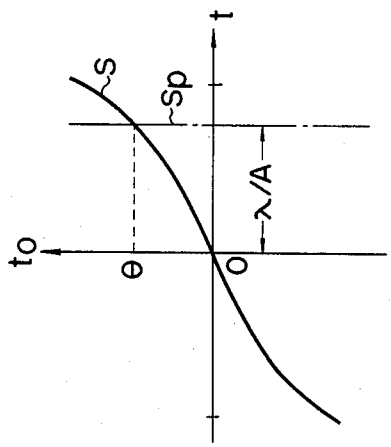
FIG. 7 is a waveform diagram to explain this second embodiment.
Figure 6B:
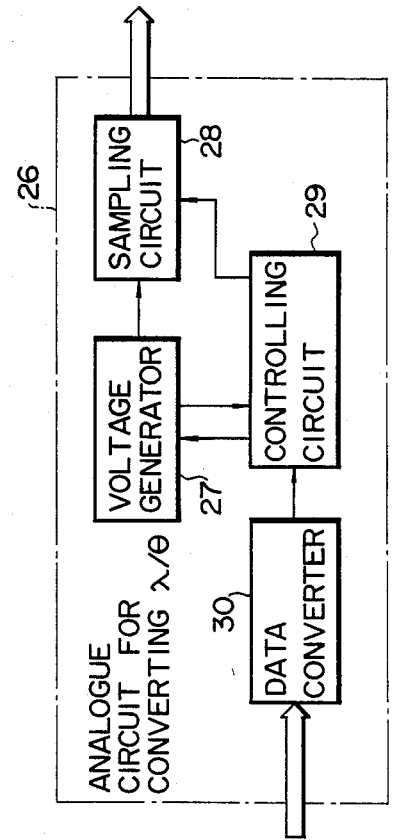

FIGS. 6A and 6B are block diagrams showing the second embodiment of this invention. FIG. 7 is a waveform diagram to explain this second embodiment. In FIG. 6(A), an analog circuit 26 is provided for converting λ/θ having an arcsine generator (voltage generator) 27 to generate an arcsine waveform S, as shown in FIG. 6(B), a sampling circuit 28 to sample and hold an output of this arcsine generator 27, a controlling circuit 29 to control the sampling circuit 28 and arcsine generator 27, and the data converter 30. When the wavelength data λ (in this case, this wavelength data λ is the voltage) is supplied from the operating panel 14, the analogue circuit 26 obtains the value of λ/A and, thereafter, it makes the arcsine generator 27 operative in response to an output of the controlling circuit 29, thereby allowing the generation of the arcsine waveform S to be started. A sampling signal $S_p$ is output from the controlling circuit 29 after only the delay time corresponding to the value of λ/A from this starting time (e.g., time $t_0$ shown in FIG. 7). The sampling circuit 28 is made operative in response to this sampling signal, and this sampling result θ is supplied as the angle data θ to a motor driver $17_a$. Therefore, in this embodiment, the wavelength data λ is converted to the angle data θ, thereby enabling the angle of the grating 1 to be controlled.

On the other hand, although the output of the arcsine generator 27 is delayed and is sampled in this embodiment, in place of this, it is also possible to provide a sine generator for generating a sine waveform and to obtain the angle data θ by measuring the time period from the time when such sine generator starts generating the sine waveform to the time when an output of the sine generator coincides with the value λ/A.

As described above, in the driving circuit of a grating according to this invention, when the wavelength data is supplied, the λ/θ converter converts the wavelength data to the angle data, and the motor driver rotates the grating in accordance with this angle data. Therefore, the wavelength/angle conversion can be performed over a wide range, and the wavelength data can be converted to the angle data with a higher degree of accuracy than in the mechanical wavelength/angle converting apparatus, such as a sine bar or the like. Further, the whole grating driving apparatus can be miniaturized since the wavelength/angle conversion is electrically performed.

In the monochromator, the grating is disposed on the axial line of the optical system so that the angle thereof can be varied from this axial line. The light supplied through an optical fiber or the like is split into spectra by the grating or the like. By selecting the spectrum through a slit in the slit apparatus, only the light of a desired wavelength from the light which is split into spectra is obtained, and, e.g., the strength of the light of each wavelength are analyzed. In a spectrum analyzer in which the wavelength of light is displayed on an abscissa axis and the strength of the light of each wavelength is displayed on an ordinate axis, the angle of the grating can be accurately set from the position information of the abscissa, namely, from the wavelength data according to this invention.

What is claimed is:

1. A driving circuit for rotating a grating of a monochromator, so as to change the wavelength of the light emitted from the monochromator, comprising:

means for supplying wavelength data λ corresponding to a desired wavelength for light emitted from the monochromator;

data converting means coupled to said wavelength data supplying means for dividing said wavelength data λ by a predetermined constant A to produce quotient data λ/A representative of the sine value of an angle corresponding to said wavelength data λ;

memory means for storing sine data $(\lambda/A)_1 = \sin \theta_1$, $(\lambda/A)_2 = \sin \theta_2 \ldots (\lambda/A)_n = \sin \theta_n$, corresponding angles $\theta_1, \theta_2 \ldots \theta_n$, and gradient data $\alpha_1, \alpha_2 \ldots \alpha_n$ between adjacent two angles of the angles $\theta_1, \theta_2 \ldots \theta_n$ corresponding, respectively, to wavelength intervals 1, 2 . . . n, with n being an integer; whereby θ represents a rotational angle of the grating, α represents a gradient of θ variation relative to λ, and, for example, determinable from $(d\theta/d\lambda) = 1\sqrt{A^2 - \lambda^2}$, and the wavelength intervals represent selective values of λ/A for which θ and α are calculated;

readout means coupled to said data converting means and to said memory means for (a) receiving said quotient data λ/A and supplying to said memory means a readout signal having a value representative of an interim one of said wavelength intervals, 1, 2 . . . n corresponding to the quotient data λ/A, for recalling from said memory means the sine value data $(\lambda/A)_m$ (m being an integer between 1 and n) of said interim wavelength interval m, (b) comparing said quotient data λ/A with said recalled sine value data $(\lambda/A)_m$, determining the interim value of m to be the final value of m when the comparison result is $(\lambda/A)_m = \lambda/A$, or if $(\lambda/A)_m \neq \lambda/A$, generating a further interim value of m which represents a higher wavelength interval m+1 when the comparison result is $(\lambda/A)_m < \lambda/A$, and which represents a lower wavelength interval m−1 when the comparison is $(\lambda/A)_m > \lambda/A$ to recall from said memory means the sine value data $(\lambda/A)_{m+1}$ or $(\lambda/A)_{m-1}$, respectively, of the wavelength interval m+1 or m−1 when the comparison result is $(\lambda/A)_m < \lambda/A$ or $(\lambda/A)_m > \lambda/A$, and determining a value of m which satisfies the relationship $(\lambda/A)_m < \lambda/A < (\lambda/A)_{m+1}$ by iteratively comparing said quotient data λ/A with the sine value data $(\lambda/A)_m$, and (c) recalling from said memory means with said readout signal for the wavelength interval corresponding to the determined final value of m the sine value data $(\lambda/A)_m$, the angle data $\theta_m$, and the gradient data $\alpha_m$;

angle data converting means for producing an angle data $\theta$ corresponding to $\theta_m$ when $(\lambda/A)_m = \lambda/A$, and if $(\lambda/A)_m \neq \lambda/A$ for producing an angle data $\theta$ for the wavelength interval corresponding to the determined final value of m from the relationship $$\theta = am\{\lambda/A - (\lambda/A)_m\} + \theta_m;$$

motor driving means for receiving said angle data and producing a motor driving signal corresponding to the angle data $\theta$;

grating means;

motor means coupled to said motor driving means for rotating said grating means;

rotation detecting means for generating a rotation value $\theta_p$ corresponding to the rotation of said grating means; and control means coupled to the rotation detecting means and to said motor driving means for driving said motor means until the rotation value $\theta_p$ is substantially equal to said angle $\theta$.

* * * * *